United States Patent
Parkinson

(10) Patent No.: US 9,590,805 B1
(45) Date of Patent: Mar. 7, 2017

(54) LADDER-BASED CRYPTOGRAPHIC TECHNIQUES USING PRE-COMPUTED POINTS

(71) Applicant: EMC Corporation, Hopkinton, MA (US)

(72) Inventor: Sean F. Parkinson, Indooroopilly (AU)

(73) Assignee: EMC IP Holding Company LLC, Hopkinton, MA (US)

( * ) Notice: Subject to any disclaimer, the term of this patent is extended or adjusted under 35 U.S.C. 154(b) by 17 days.

(21) Appl. No.: 14/580,956

(22) Filed: Dec. 23, 2014

(51) Int. Cl.
*H04L 29/06* (2006.01)
*H04L 9/08* (2006.01)
*H04L 9/32* (2006.01)

(52) U.S. Cl.
CPC .......... *H04L 9/0819* (2013.01); *H04L 9/3247* (2013.01); *H04L 2209/24* (2013.01); *H04L 2209/72* (2013.01)

(58) Field of Classification Search
CPC . H04L 9/0819; H04L 9/3247; H04L 2209/24; H04L 2209/72
USPC ...................... 380/44, 30, 28, 263
See application file for complete search history.

(56) References Cited

U.S. PATENT DOCUMENTS

| | | | |
|---|---|---|---|
| 6,252,960 B1 * | 6/2001 | Seroussi | G06F 7/725 380/30 |
| 6,466,668 B1 * | 10/2002 | Miyazaki | G06F 7/728 380/30 |
| 6,738,478 B1 * | 5/2004 | Vanstone | G06F 7/725 380/28 |
| 6,778,666 B1 * | 8/2004 | Kuzmich | H04L 9/3066 380/28 |
| 7,046,801 B2 * | 5/2006 | Okeya | G06F 7/725 380/28 |
| 8,045,705 B2 * | 10/2011 | Antipa | G06F 7/725 380/259 |
| 8,194,855 B2 * | 6/2012 | Shantz | G06F 7/5324 380/30 |
| 8,345,864 B1 | 1/2013 | Robinson et al. | |

(Continued)

OTHER PUBLICATIONS

K. Mowery et al., "Are AES x86 Cache Timing Attacks Still Feasible?" ACM Workshop on Cloud Computing Security Workshop (CCSW), Oct. 2012, pp. 19-24.

(Continued)

*Primary Examiner* — David García Cervetti
(74) *Attorney, Agent, or Firm* — Ryan, Mason & Lewis, LLP

(57) ABSTRACT

A method includes receiving a first input value and a second input value, and obtaining a set of pre-computed values, wherein each pre-computed value is computed as the first input value multiplied by a given multiple in a set of multiples comprising powers of 2. A cryptographic process is performed to generate a cryptographic value based on the first and second input values, and one or more of the pre-computed values, wherein the cryptographic value that is generated is usable to generate a secure message or digital signature. The cryptographic process includes performing an iterative scalar multiplication process in which each step of the iterative scalar multiplication process is performed using a single point add operation to multiply a bit of the second input value with one of the pre-computed values in the set of pre-computed values.

18 Claims, 5 Drawing Sheets

(56) References Cited

U.S. PATENT DOCUMENTS

| | | | | |
|---|---|---|---|---|
| 8,358,779 B1* | 1/2013 | Sun | G06F 7/725 | 380/28 |
| 8,411,855 B1 | 4/2013 | Robinson et al. | | |
| 8,422,671 B2* | 4/2013 | Yoon | H04L 9/28 | 380/28 |
| 8,428,252 B1 | 4/2013 | Makepeace et al. | | |
| 8,498,411 B1 | 7/2013 | Parkinson et al. | | |
| 8,559,625 B2* | 10/2013 | Douguet | G06F 7/725 | 380/225 |
| 8,682,951 B2* | 3/2014 | Boscher | G06F 7/723 | 708/491 |
| 8,707,042 B2* | 4/2014 | Schneider | H04L 9/3026 | 380/259 |
| 8,744,072 B2* | 6/2014 | Joye | G06F 7/723 | 380/28 |
| 8,913,739 B2* | 12/2014 | Golic | G06F 7/725 | 380/28 |
| 9,536,275 B1 | 1/2017 | Diard | G06T 1/20 | |
| 2003/0142820 A1* | 7/2003 | Futa | G06F 7/725 | 380/30 |
| 2003/0211842 A1* | 11/2003 | Kempf | H04L 9/0825 | 455/411 |
| 2004/0267859 A1* | 12/2004 | Fischer | G06F 7/723 | 708/606 |
| 2005/0152541 A1* | 7/2005 | Takenaka | G06F 7/725 | 380/28 |
| 2006/0029220 A1* | 2/2006 | Ibrahim | G06F 7/725 | 380/28 |
| 2006/0029221 A1* | 2/2006 | Ibrahim | G06F 7/725 | 380/28 |
| 2006/0045262 A1* | 3/2006 | Orlando | G06F 7/725 | 380/28 |
| 2006/0093137 A1* | 5/2006 | Izu | G06F 7/725 | 380/30 |
| 2006/0285682 A1* | 12/2006 | Sarangarajan | H04L 9/003 | 380/28 |
| 2007/0064931 A1* | 3/2007 | Zhu | G06F 7/725 | 380/30 |
| 2007/0116270 A1* | 5/2007 | Fischer | G06F 7/722 | 380/30 |
| 2007/0150530 A1* | 6/2007 | Mevergnies | G06F 7/723 | 708/7 |
| 2007/0177721 A1* | 8/2007 | Itoh | G06F 7/723 | 380/28 |
| 2008/0005586 A1* | 1/2008 | Munguia | G06F 12/1408 | 713/189 |
| 2008/0019509 A1* | 1/2008 | Al-Gahtani | H04L 9/003 | 380/30 |
| 2008/0025498 A1* | 1/2008 | Vasyltsov | G06F 7/725 | 380/28 |
| 2008/0031443 A1* | 2/2008 | Vasyltsov | G06F 7/725 | 380/2 |
| 2008/0031444 A1* | 2/2008 | Vasyltsov | G06F 7/725 | 380/2 |
| 2008/0049931 A1* | 2/2008 | Vasyltsov | G06F 7/725 | 380/28 |
| 2008/0086641 A1* | 4/2008 | Rodgers | H04L 9/0891 | 713/176 |
| 2008/0205638 A1* | 8/2008 | Al-Gahtani | G06F 7/725 | 380/30 |
| 2008/0205639 A1* | 8/2008 | Braun | G06F 7/723 | 380/30 |
| 2008/0260143 A1* | 10/2008 | Ibrahim | G06F 7/725 | 380/28 |
| 2008/0273695 A1* | 11/2008 | Al-Gahtani | G06F 7/725 | 380/30 |
| 2008/0275932 A1* | 11/2008 | Ebeid | G06F 7/725 | 708/620 |
| 2009/0003590 A1* | 1/2009 | Brown | G06F 7/725 | 380/28 |
| 2009/0003596 A1* | 1/2009 | Ozturk | G06F 7/725 | 380/30 |
| 2009/0024352 A1* | 1/2009 | Braun | G06F 7/725 | 702/150 |
| 2009/0034720 A1* | 2/2009 | Baek | G06F 7/725 | 380/30 |
| 2009/0041229 A1* | 2/2009 | Douguet | G06F 7/725 | 380/28 |
| 2009/0046851 A1* | 2/2009 | Elmegaard-Fessel | G06F 7/725 | 380/28 |
| 2009/0052657 A1* | 2/2009 | Golic | G06F 7/725 | 380/28 |
| 2009/0067617 A1* | 3/2009 | Trichina | G06F 7/723 | 380/28 |
| 2009/0092245 A1* | 4/2009 | Fumaroli | G06F 7/723 | 380/28 |
| 2009/0113252 A1* | 4/2009 | Lambert | G06F 7/725 | 714/48 |
| 2009/0214023 A1* | 8/2009 | Al-Somani | G06F 7/725 | 380/28 |
| 2009/0214025 A1* | 8/2009 | Golic | G06F 7/725 | 380/28 |
| 2009/0235073 A1* | 9/2009 | Braun | H04L 9/3273 | 713/169 |
| 2009/0238360 A1* | 9/2009 | Ciet | G06F 7/556 | 380/28 |
| 2009/0240756 A1* | 9/2009 | Boscher | G06F 7/723 | 708/491 |
| 2009/0285388 A1* | 11/2009 | Georgiades | G06F 7/725 | 380/30 |
| 2009/0292921 A1* | 11/2009 | Braun | G06F 7/725 | 713/169 |
| 2010/0040225 A1* | 2/2010 | Venelli | G06F 7/725 | 380/28 |
| 2010/0111296 A1* | 5/2010 | Brown | H04L 9/0643 | 380/28 |
| 2010/0183142 A1* | 7/2010 | Katagi | G06F 7/725 | 380/28 |
| 2010/0195821 A1* | 8/2010 | Fischer | G06F 7/725 | 380/28 |
| 2010/0232601 A1* | 9/2010 | Itoh | G06F 7/725 | 380/28 |
| 2010/0322422 A1* | 12/2010 | Al-Gahtani | G06F 7/725 | 380/255 |
| 2011/0107097 A1* | 5/2011 | Braun | G06F 7/725 | 713/168 |
| 2011/0213982 A1* | 9/2011 | Brown | H04L 9/3066 | 713/176 |
| 2012/0140921 A1* | 6/2012 | Ghouti | H04L 9/302 | 380/44 |
| 2012/0207298 A1* | 8/2012 | Meyer | G06F 7/725 | 380/28 |
| 2012/0278375 A1* | 11/2012 | Belenky | G06F 7/725 | 708/603 |
| 2012/0288086 A1* | 11/2012 | Schaffer | G06F 7/724 | 380/28 |
| 2014/0105381 A1* | 4/2014 | Al-Somani | G06F 7/725 | 380/28 |
| 2014/0177827 A1* | 6/2014 | Al-Somani | H04L 9/30 | 380/30 |
| 2014/0215219 A1* | 7/2014 | Meyer | H04L 9/3247 | 713/176 |
| 2014/0334621 A1* | 11/2014 | Abarzua | G06F 7/725 | 380/28 |
| 2015/0092940 A1* | 4/2015 | Abarzua | G06F 7/725 | 380/28 |
| 2015/0092941 A1* | 4/2015 | Ghosh | H04L 9/3066 | 380/30 |
| 2015/0256340 A1* | 9/2015 | Joye | H04L 9/0816 | 380/30 |
| 2015/0339102 A1* | 11/2015 | Feix | G06F 7/725 | 380/30 |
| 2016/0072622 A1* | 3/2016 | Al-Somani | H04L 9/003 | 380/28 |
| 2016/0087802 A1* | 3/2016 | Peeters | G06F 7/725 | 713/176 |

(56) References Cited

U.S. PATENT DOCUMENTS

| | | | | |
|---|---|---|---|---|
| 2016/0134417 A1* | 5/2016 | Houssain | ................ | H04L 9/003 |
| | | | | 380/28 |
| 2016/0149703 A1* | 5/2016 | Al-Somani | ........... | H04L 9/3066 |
| | | | | 380/28 |
| 2016/0149704 A1* | 5/2016 | Al-Somani | ............. | G06F 7/725 |
| | | | | 380/30 |

OTHER PUBLICATIONS

J.-M. Schmidt et al., "Fault Attacks on the Montgomery Powering Ladder," 13th International Conference on Information Security and Cryptology (ICISC), Dec. 2010, pp. 396-406, Seoul, Korea.

D. Karaklajić et al., "Low-Cost Fault Detection Method for ECC Using Montgomery Powering Ladder," Design, Automation & Test in Europe Conference & Exhibition (Date), Mar. 2011, pp. 1-6, Grenoble, France.

M. Joye et al., "The Montgomery Powering Ladder," Revised Papers from the 4th International Workshop on Cryptographic Hardware and Embedded Systems (CHES), Aug. 2002, pp. 291-302.

* cited by examiner

LADDER-BASED CRYPTOGRAPHIC TECHNIQUES USING PRE-COMPUTED POINTS

FIELD

The field relates to computer networks, and more particularly to cryptographic algorithms employed in such computer networks.

BACKGROUND

In general, encryption techniques are commonly used to achieve data security. An encryption process involves converting data in plain text into an unreadable text called cipher text. A decryption process involves converting cipher text back to the corresponding plain text. Cryptography techniques are based on encryption and decryption of data, wherein the encryption and decryption utilize secret information, referred to as a "key", which is used to convert plain text to cipher text and vice versa. Various cryptography techniques have been developed for creating keys (e.g., public and private keys) for protecting data communications or authenticating messages.

For instance, the well-known Montgomery Ladder algorithm is used in cryptographic algorithms to perform exponentiation of numbers in a prime field, for example in RSA, and to perform scalar multiplication on elliptic curves in Elliptic Curve Cryptography (ECC), including, for example, Elliptic Curve Diffie-Hellman (ECDH) and Elliptic Curve Digital Signature Algorithm (ECDSA). A primary advantage of the Montgomery Ladder algorithm is that the algorithm runs in constant time with high regularity. That is, regardless of the exponent or scalar, the same number of operations is performed. This property is used to mitigate timing attacks and side-channel attacks that can be performed on exponentiation and scalar multiplication operations implemented in hardware and on Intel x86 CPUs. Moreover, implementations of the Montgomery Ladder algorithm can also be resistant to cache-line attacks on Intel x86 CPUs.

Specifically, the Montgomery Ladder algorithm is commonly used to efficiently perform scalar multiplication operations with Montgomery elliptic curves. For ECC scalar operations, pre-computation can be performed when a fixed elliptic curve point (e.g., generator or base point) is used in multiple scalar multiplication calculations. By pre-computing some values before any of the scalar multiplication calculations are performed, the number of operations required in each scalar multiplication calculation for ECC can be reduced. A drawback of the Montgomery Ladder algorithm is that it does not lend itself to pre-computation.

SUMMARY

Illustrative embodiments of the invention provide ladder-based cryptographic techniques that are configured to perform accelerated scalar multiplication using pre-computed values for various types of curves such as elliptic curves.

For example, in one embodiment of the invention, a method includes receiving a first input value and a second input value, and obtaining a set of pre-computed values, wherein each pre-computed value is computed as the first input value multiplied by a given multiple in a set of multiples comprising powers of 2. A cryptographic process is performed to generate a cryptographic value based on the first and second input values, and one or more of the pre-computed values, wherein the cryptographic value that is generated is usable to generate a secure message or digital signature. The cryptographic process includes performing an iterative scalar multiplication process in which each step of the iterative scalar multiplication process is performed using a single point add operation to multiply a bit of the second input value with one of the pre-computed values in the set of pre-computed values.

In another embodiment, an article of manufacture is provided which comprises a processor-readable storage medium having encoded therein executable code of one or more software programs. The one or more software programs when executed by at least one processing device implement steps of the above-described method.

In a further embodiment, an apparatus comprises a memory and a processor operatively coupled to the memory and configured to perform steps of the above-described method.

Other embodiments of the invention will be described in the following detailed description, which is to be read in conjunction with the accompanying drawings.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices. While illustrative embodiments of the invention will be described herein in the context of a ladder-based cryptographic methods that are configured to perform accelerated scalar multiplication for various curves such as elliptic curves (e.g., Montgomery curves), it is to be appreciated that embodiments of the invention are readily applicable for use in performing accelerated modular exponentiation in public key cryptographic techniques such as RSA, for example.

Figure 1:
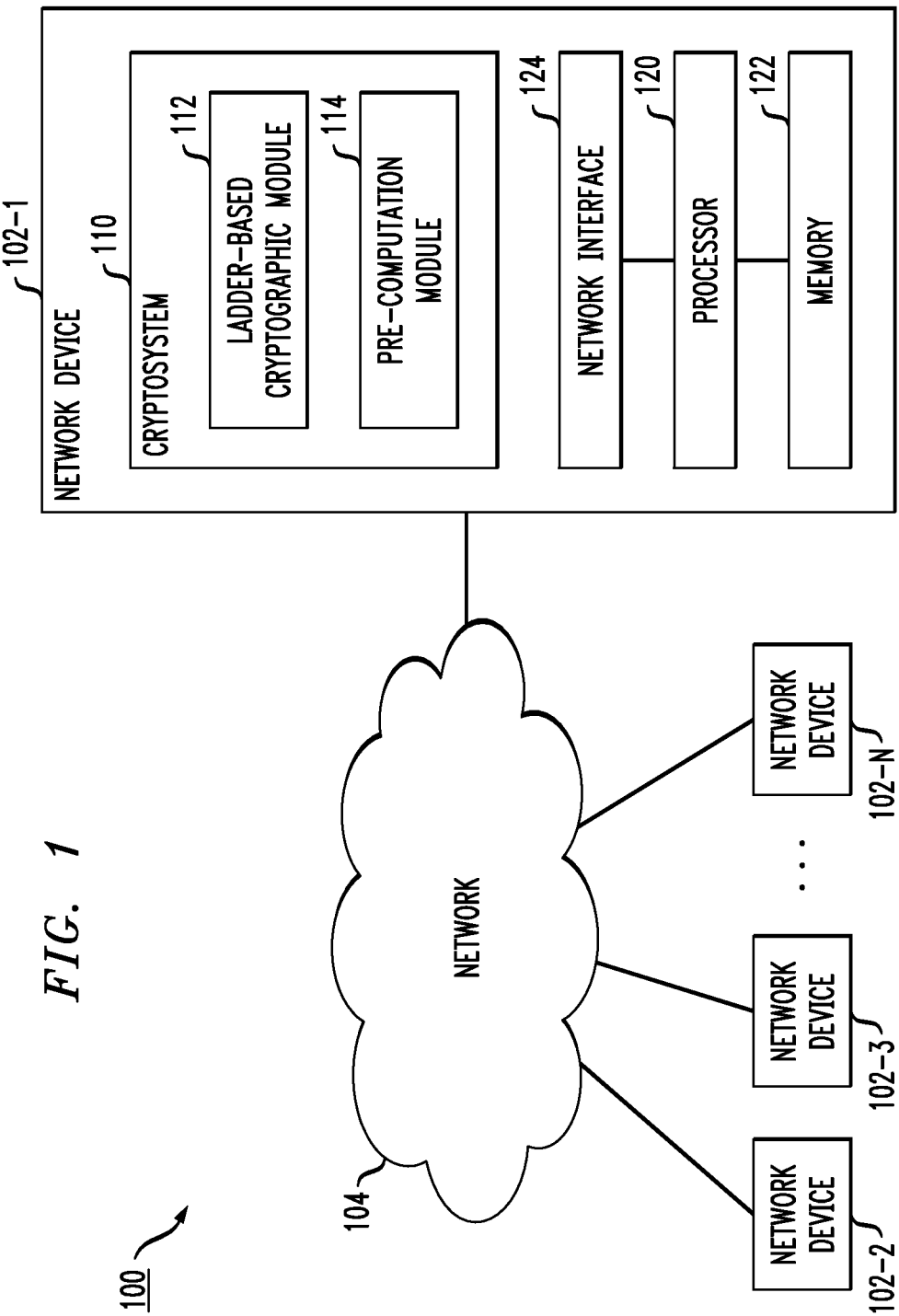
FIG. 1 illustrates a computing system which implements a cryptographic system according to an embodiment of the invention.

FIG. 1 illustrates a computing system 100 which implements a cryptographic system according to an embodiment of the invention. The computing system 100 comprises a plurality of network devices 102-1, 102-2, 102-3, . . . , 102-N, which are coupled to a network 104. The network devices 102-1, 102-2, 102-3, . . . , 102-N may comprise, for example, client devices, web servers, network appliances or other types of devices, in any combination. Such devices are examples of what are more generally referred to herein as "processing devices."

It is assumed that the network devices 102-1, 102-2, 102-3, . . . , 102-N comprise respective computers associated with a particular activity or enterprise that requires cryptographic operations to be employed during communications (e.g., data or message exchange) between the network devices and/or devices outside the network. Numerous operating scenarios involving a wide variety of different types and arrangements of processing devices and networks are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising network devices configured to communicate using the Internet Protocol (IP) or other related communication protocols.

As shown, network device 102-1 is configured with a cryptosystem 110. It is to be understood that the term "cryptosystem" generally refers to a system (e.g., configured as software, hardware, or combinations thereof) that performs one or more cryptographic operations. In one embodiment, the cryptosystem 110 comprises a ladder-based cryptographic module 112 and a pre-computation module 114. In one embodiment of the invention, the ladder-based cryptographic module 112 implements ladder-based cryptographic methods that are configured to perform accelerated scalar multiplication for various types of curves such as elliptic curves (e.g., Montgomery curves) using pre-computed values generated by the pre-computation module 114.

Moreover, an embodiment of the ladder-based cryptographic module 112 implements methods that are a variation on a standard Montgomery Ladder process that utilizes an add-double process for scalar multiplication on elliptic curves. For example, in one embodiment of the invention, the ladder-based cryptographic module 112 implements a "Power Ladder" algorithm in which a "power-add" function is utilized to perform a single point add operation per bit of the scalar value. Illustrative embodiments of cryptographic functions that are implemented by the ladder-based cryptographic module 112 will be discussed in further detail below with reference to FIGS. 2-6. In one embodiment of the invention, the pre-computation module 114 is configured to pre-compute multiples of a fixed point (e.g., base point or public point of a named curve) for use in accelerated scalar multiplication and other operations performed by the ladder-based cryptographic module 112. For example, in one embodiment of the invention, where the ladder-based cryptographic module 112 performs a scalar multiplication operation to compute a value nP (where n is a scalar and P is a fixed point), the pre-computation module 114 pre-computes a set of values from the fixed point P, wherein the values are the fixed point multiplied by all powers of 2 less than the scalar n. For example if the scalar is 123, then the algorithm uses the fixed point P multiplied by: $2^0=1$, $2^1=2$, $2^2=4$, $2^3=8$, $2^4=16$, $2^5=32$ and $2^6=64$.

In one embodiment of the invention, the set of pre-computed values is persistently stored and accessed to perform scalar multiplication operations. In another embodiment of the invention, a memory-time trade-off can be made where a standard doubling operation (for scalar multiplication) is performed in real-time as part of a ladder-based cryptographic process to compute the values not pre-computed and persistently stored. In yet another embodiment of the invention, one or more multiples can be computed in real-time in parallel with a scalar multiplication process. Illustrative embodiments of pre-computation functions that are implemented by the pre-computation module 114 will be discussed in further detail below with reference to FIG. 2, for example.

Network device 102-1 in the FIG. 1 embodiment is assumed to be implemented using at least one processing device. Each such processing device generally comprises at least one processor and an associated memory, and implements one or more functional modules for controlling certain features of the cryptosystem 110. More particularly, network device 102-1 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the invention. A given such article of manufacture comprises, for example, a storage device such as a storage disk, a storage array or an integrated circuit containing memory. The term "article of manufacture" as used herein should be understood to exclude transitory, propagating signals.

The network interface 124 allows the network device 102-1 to communicate over the network 104 with one or more of network devices 102-2, 102-3, . . . , 102-N, or other devices (not expressly shown), and illustratively comprises one or more conventional transceivers.

In one or more illustrative embodiments, at least portions of the cryptosystem 110, such as portions of one or more of the ladder-based cryptographic module 112 and the pre-computation module 114, may be implemented at least in part in the form of software that is stored in memory 122 and executed by processor 120.

It is to be understood that the particular arrangement of modules is presented in FIG. 1 by way of example only, and alternative arrangements can be used in other embodiments. For example, the functionality associated with the modules 112 and 114 in other embodiments can be combined into a single module, or separated across a larger number of modules. Moreover, the particular set of elements for performing the ladder-based cryptographic and pre-computation functions in the network device 102-1 (or other devices in the computing system 100) is presented by way of illustrative example only, and in other embodiments of the invention, additional or alternative elements may be used. Thus, another embodiment may include additional or alternative systems, devices and other network entities, as well as different arrangements of modules and other components. Furthermore, it is to be understood that one or more of network devices 102-2, 102-3, . . . , 102-N may be configured with the same or similar arrangement illustratively shown and described above for network device 102-1.

Figure 2:
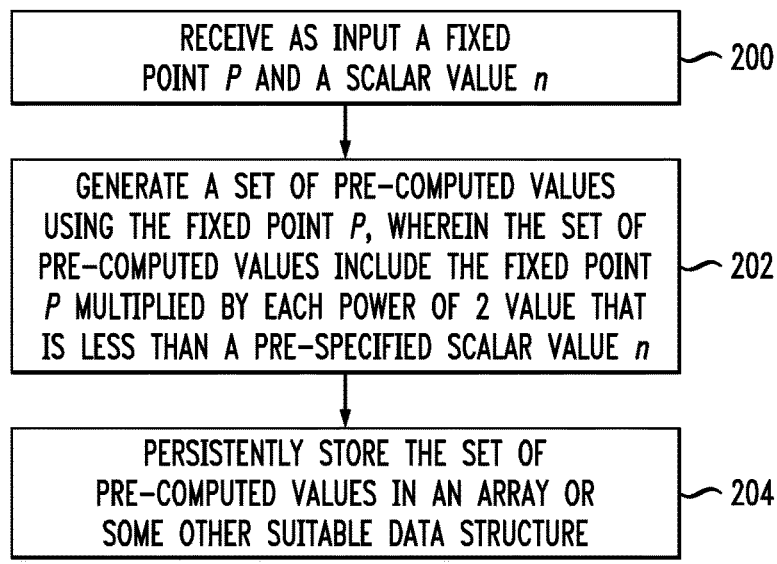
FIG. 2 is a flow diagram of method for pre-computing a set of values from a fixed point for use in performing a ladder-based cryptographic method according to an embodiment of the invention.

FIG. 2 is a flow diagram of method for pre-computing a set of values from a fixed point for use in performing a ladder-based cryptographic method according to an embodiment of the invention. In particular, FIG. 2 illustrates a mode of operation of the pre-computation module 114 shown in FIG. 1 to generate a set of pre-computed values that can be used to perform scalar multiplication operations using the ladder-based cryptographic methods as discussed in further detail below with reference to FIGS. 3 and 4, for example.

Referring to FIG. 2, an initial step comprises receiving as input a fixed point P (block 200). In one embodiment of the invention, a scalar multiplication process is accelerated by pre-computing multiples of a point P, wherein the fixed point P can be a base point or a public point of a named curve. For example, an ECC scalar multiplication process involves the multiplication of base point P on an elliptic curve by a scalar n, i.e., computing the curve point nP given the scalar (integer) n and the base point P.

Next, a set of pre-computed values is obtained using the fixed point P, wherein the set of pre-computed values include the fixed point P multiplied by each power of 2 value that is less than the scalar value n (block 202). For example, assume that the scalar value n=123, which is represented in binary form with the following bits, i.e., 1111011. The pre-computation module 114 would multiply the fixed point P by each of $2^0, \ldots, 2^{m-1}$, where m=maximum number of bits needed to represent scalar n in binary form. In this example, since the maximum number of bits m=7 (for scalar n=123), the pre-computation module 114 would compute: $2^0.P=1P$; $2^1.P=2P$; $2^2.P=4P$; $2^3.P=8P$; $2^4.P=16P$; $2^5.P=32P$; and $2^6.P=64P$.

The pre-computed vales are then persistently stored an array or some other suitable data structure (block 204). For example, in one embodiment of the invention, the following array K or table data structure can be used to store the pre-computed values of nP for the above example where n=123:

TABLE

| Array Index | K[0] | K[1] | K[2] | K[3] | K[4] | K[5] | K[6] |
| --- | --- | --- | --- | --- | --- | --- | --- |
| Value | P | 2P | 4P | 8P | 16P | 32P | 64P |

As illustrated above, the first entry K[0] in the TABLE for index 0 is 1.P. Each entry after that is double the previous and therefore the table is made up of the powers of 2 multiplied by the fixed point P.

An embodiment of the pre-computation process of FIG. 2 is illustrated by the following block of pseudo code:
Pre-Computation Process
Input: P is the fixed point to multiply.
Output: K is an array of pre-computed points.
1. A=P
2. For i=0 upto m (max bits)−1
3. K[i]=A
4. A=2*A (affine output)

In line 1 of the block of pseudo code shown above, a parameter A is initialized to the value P. This step essentially initializes the parameter A to the value $2^0.P=1P=P$. Next, lines 2-4 of the code provide an iterative loop over an index (i) starting from 0 up to the value m−1, wherein m is the number of bits of the scalar (e.g., m=7 for scalar 123). In line 3, the current value of A is stored in the entry of the array K having the index K[i]. For the first iteration of the loop where (i)=0, the value of A=P is stored in K[0]. In line 4 of the block of pseudo code shown above, the value of A is doubled. For the next iteration of the loop, the index (i) is set to 1, and the current value of A=2A=2P is stored in K[1]. The iterative loop is repeated up to the index value m−1 to generate an array K, such as shown in the above example TABLE for m=7.

Figure 3:
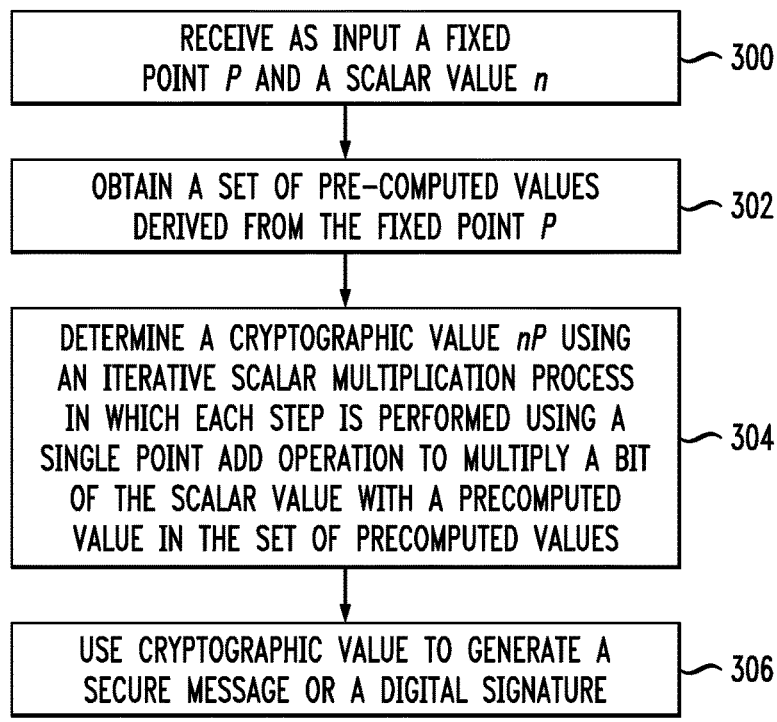
FIG. 3 is a high-level flow diagram of a ladder-based cryptographic method according to an embodiment of the invention.

FIG. 3 is a high-level flow diagram of a ladder-based cryptographic method according to an embodiment of the invention. In particular, FIG. 3 illustrates an embodiment of a method for performing a ladder-based cryptographic operation which utilizes pre-computed values and a power-add function to perform a scalar multiplication process, for example. An initial step includes receiving as input a first input value (e.g., a fixed point P) and a second input value (e.g., a pre-specified scalar value n) (block 300). Next, a cryptographic process is performed to generate a cryptographic value based on the first and second input values. The cryptographic process comprises obtaining a set of pre-computed values that are derived from the first input value (e.g., P) (block 302). For example, in one embodiment of the invention, as discussed above with reference to FIG. 2, the set of pre-computed values may include values that are computed by multiplying the fixed point P by each of $2^0, \ldots, 2^{m-1}$, where m=maximum number of bits needed to represent scalar n in binary form.

In one embodiment of the invention, the set of pre-computed values can be obtained by computing the set of pre-computed values prior to performing the cryptographic process, storing the set of pre-computed values in memory, and accessing the stored set of pre-computed values during the cryptographic process. In another embodiment of the invention, the set of pre-computed values can be obtained by computing at least one of the pre-computed values in the set of pre-computed values prior to performing the cryptographic process, and then computing at least one of the pre-computed values in the set of pre-computed values in parallel with performing the cryptographic process.

A next step includes determining a cryptographic value (e.g., nP) using an iterative scalar multiplication process in which each step is performed using a single point add operation (referred to herein as "power-add" function) to multiply a bit of the second input value (e.g., the scalar n) with a pre-computed value from the set of pre-computed values (block 304). Alternate embodiments of the invention for implementing a scalar multiplication process using a power-add function (for block 304) will be described in further detail below with reference to FIGS. 4 and 5, for example.

The cryptographic value is used to generate a secure message or digital signature (block 306). For example, in an ECC scalar multiplication process, wherein the curve point nP is computed given the scalar integer n and the fixed curve point P, various cryptographic methods may be applied. For example, for key generation, the scalar value n can be the secret key of Entity1, and nP can be the public key of Entity1. For digital signature techniques, the scalar value n can be a nonce, wherein nP is part of a digital signature. Moreover, for DH key exchange, the scalar value n can be the secret key of Entity1, P can be the public key of Entity2, and some key derivative function applied to nP can be the secret key shared between Entity1 and Entity2.

As noted above, in one embodiment of the invention, the ladder-based cryptographic module 112 of FIG. 1 implements a "Power Ladder" algorithm in which a power-add function is utilized to perform a single point add operation per bit of the scalar value n. More specifically, in one embodiment of the invention, a Power Ladder algorithm is a variation of the Montgomery Ladder algorithm, wherein a Power Ladder algorithm can be configured to perform an exponentiation or scalar multiplication using a set of pre-computed values and fewer operations (as compared to conventional Montgomery Ladder techniques), as well as configured to be constant time and cache-line attack resistant. As is known in the art, a standard Montgomery Ladder is useful when performing scalar multiplications on a Montgomery Curve due to the difference between the two addends always being one times the point P. As explained in further detail below, with a Power Ladder process according to an embodiment of the invention, the pre-computed values are chosen to ensure that such difference is always known.

A typical Montgomery Ladder algorithm requires one point add and one point double operation for every step, which is referred to as an "add-double" step. In a scalar multiplication process using a typical Montgomery Ladder algorithm, one add-double step is required per each bit of the scalar. In contrast, a Power Ladder algorithm according to an embodiment of the invention implements a single point add operation per step, which is referred to herein as a "power-add" function or step. As explained in further detail below with reference to FIGS. 4 and 5, for example, for a scalar multiplication process, only one power-add step is performed per each bit of the scalar value n. Moreover, a power-add function according to an embodiment of the invention and a point add operation used in a standard add-double step are not implemented using the same field operations.

Figure 4:
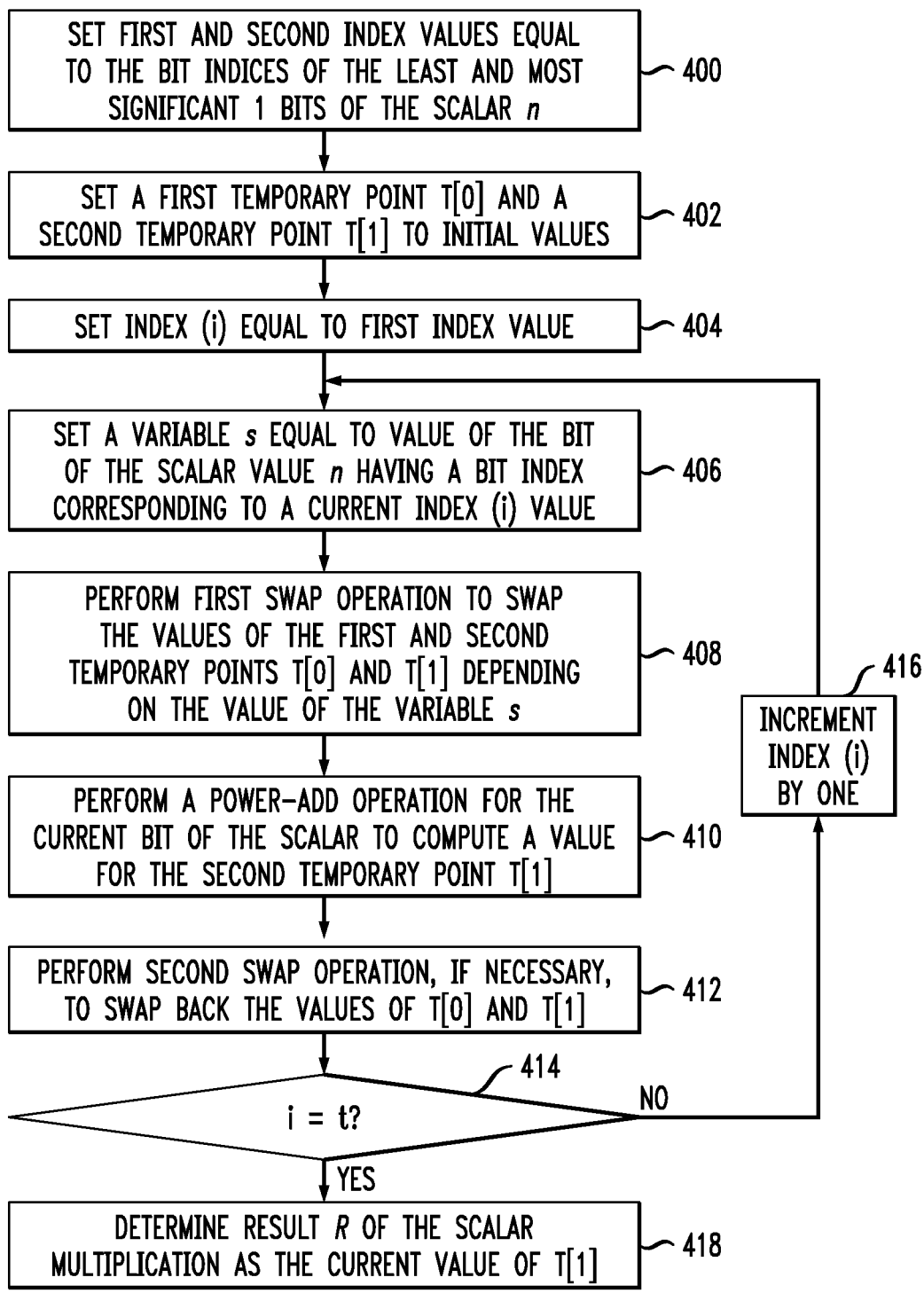
FIG. 4 is a flow diagram that illustrates details of an iterative scalar multiplication process that is used to implement the ladder-based cryptographic method of FIG. 3, according to an embodiment of the invention.

FIG. 4 is a flow diagram which illustrates details of an iterative scalar multiplication process that is used to implement the ladder-based cryptographic method of FIG. 3, according to an embodiment of the invention. In particular, in one embodiment of the invention, FIG. 4 illustrates a Power Ladder method that is used to perform the process of block 304 in FIG. 3. Moreover, the following block of pseudo code illustrates an embodiment of a Power Ladder process, which will be described in conjunction with the flow diagram of FIG. 4.

A. Power Ladder Process
Input: K is an array of pre-computed points derived from P.
Input: n is scalar to multiply the point P by
Output: R=n.P
1A. b=base 2 index of first 1 in n (least significant 1)
2A. t=base 2 index of last 1 in n (most significant 1)
3A. T[0]=0
4A. T[1]=K[b]
5A. For i=b upto t
6A. s=n[i]
7A. T=T[1]; T[1−s]=T[0]; T[s]=T
8A. T[1]=power-add(T[1], T[0], K[i])
9A. T=T[1]; T[1−s]=T[0]; T[s]=T
10A. R=T[1]

Referring to FIG. 4, an initial step includes setting first and second index values equal to the bit indices of the least and most significant 1 bits of the scalar (block 400). For example, in one embodiment of the invention as shown in lines 1A and 2A of the block of pseudo code shown above, a first index value b is set equal to the bit index of the bit of the scalar value n which contains the least significant "1," and a second index value t is set equal to the bit index of the bit of the scalar value n which contains the most significant "1." By way of example, based on the example scalar value n=123 noted above, which has a binary representation of 1111011, the first index value b=0, and the second index value t=6.

Next, a first temporary point T[0] and a second temporary point T[1] are set to initial values (block 402). For example, in one embodiment of the invention as shown in lines 3A and 4A of the block of pseudo code shown above, the first temporary point is set T[0]=0 (i.e., 0.P=0) and the second temporary point is set T[1]=K[b], wherein K[b] denotes the pre-computed value in the array K having the index of K[b]. Following the above example where b=0, the second temporary point is set T[1]=K[0]=P.

An iterative scalar multiplication process is then performed over an index (i) starting from value of the first index b up to the value of the second index t. In one embodiment of the invention, the iterative process is depicted in lines 5A-9A of the block of pseudo code shown above, and blocks (404-416) of FIG. 4. As an initial step, the index (i) is set equal to the first index value b (block 404). Then, a variable s is set equal to a value of the bit of the scalar value n having a bit index corresponding to a current value of the index(i), i.e., s=n[i] (block 406). By way of example, continuing with the above example where n=123 (binary 1111011), the index (i) is initially set to 0 (as b=0), and the parameter s=1 (as the bit value of the bit index n[0]=1 (i.e., the bit value of the $2^{i=0}$ bit is 1).

Next, a first swap operation is performed to swap the values of the first and second temporary points T[0] and T[1] depending the value of the variable s (block 408). In one embodiment of the invention, if s=0, the values of the first and second temporary points T[0] and T[1] are swapped, whereas if s=1, the values of the first and second temporary points T[0] and T[1] are not swapped. By way of specific example, in one embodiment of the invention as shown in line 7A of the block of pseudo code shown above, a temporary point value T is set equal to T[1]. If s=0, then T[1−s] will be equal to T[1−0] (or T[1]). Consequently, T[1] will be set to T[0], and T[0] (i.e., T[s=0]) will be set equal to the temporary point value T=T[1]. In this regard, the values of T[0] and T[1] are swapped. On the other hand, if s=1, then T[1−s] will be equal to T[1−1] (or T[0]). Consequently, T[0] will be equal to T[0], and T[1] (i.e., T[s=1]) will be set equal to the temporary point value T=T[1]. In this regard, the values of T[0] and T[1] are not swapped.

A power-add operation is then performed for the current bit of the scalar to compute a value for the second temporary point T[1] (block 410). By way of specific example, in one embodiment of the invention as shown in line 8A of the block of pseudo code shown above, a power-add function is applied based on the values T[1], T[0], K[i] to compute a value for T[1]. The power-add function adds T[1] and K[i], with knowledge of the difference between T[1] and K[i], wherein the difference is held in T[0]. The result of the power-add operation is held in T[1], wherein the value being added to the pre-computed value is updated. Following the power-add operation, a second swap operation is performed (block 412), if necessary, to swap back the values of T[0] and T[1] using the same operations discussed above for block 408 (see, e.g., line 9A of the block of pseudo code shown above).

Following each loop of the iterative process, a determination is made as to whether the index (i) is equal to t (block 414). If the index value (i) has not reached t (negative determination in block 414), then the index (i) is incremented by 1 (block 416), and the iterative process (blocks 406-412) is repeated. On the other hand, when the index value (i)=t (affirmative determination in block 414), then the result R of the scalar multiplication is determined as the current value of T[1] (block 418), as shown in line 10A of the block of pseudo code shown above.

As explained in further detail below, a Power Ladder method works for Montgomery curves, with its restriction that an addition cannot be performed without already knowing the difference. In the above described Power Ladder process, at the start of each loop there is the invariant: $T[0]=2^i \cdot P - T[1]$.

When a given bit of the scalar n is 0, n[i]=0, then the iterative loop will add $2^i \cdot P$ to T[0] which results in T[0]' being equal to $2^{i+1} \cdot P$ and T[1]' being equal to T[1]. Therefore, when computing the power-add, A=B+C with D=B−C, $A=T[0]'=2^{i+1} \cdot P$, $B=2^i \cdot P$, $C=T[0]=2^i - T[1]$, and it can be seen that D will be T[1], which is known. Therefore at the start of the next loop, the invariant $T[0]=2^i \cdot P - T[1]$ holds.

On the other hand, when a given bit of the scalar n is 1, n[i]=1, then the loop will add $2^i \cdot P$ to T[1], which results in $T[1]'=2^i \cdot P + T[1]$, and T[0]' being equal to T[0]. Therefore, when computing the power-add, A=B+C with D=B−C, $A=T[1]'=2^i \cdot P + T[1]$, $B=2^i \cdot P$, $C=T[1]$, and it can be seen that D is $2^i \cdot P - T[0]=T[1]$ which is known. Therefore, at the start of the next loop, the invariant $T[0]=2^i \cdot P - T[1]$ holds. In this regard, it is to be noted that since T[1] never changes, the value of the scalar bit is zero and increases by $2^i \cdot P$ when the scalar bit is one. T[1] will hold n.P when the bits are taken from n.

Figure 5:
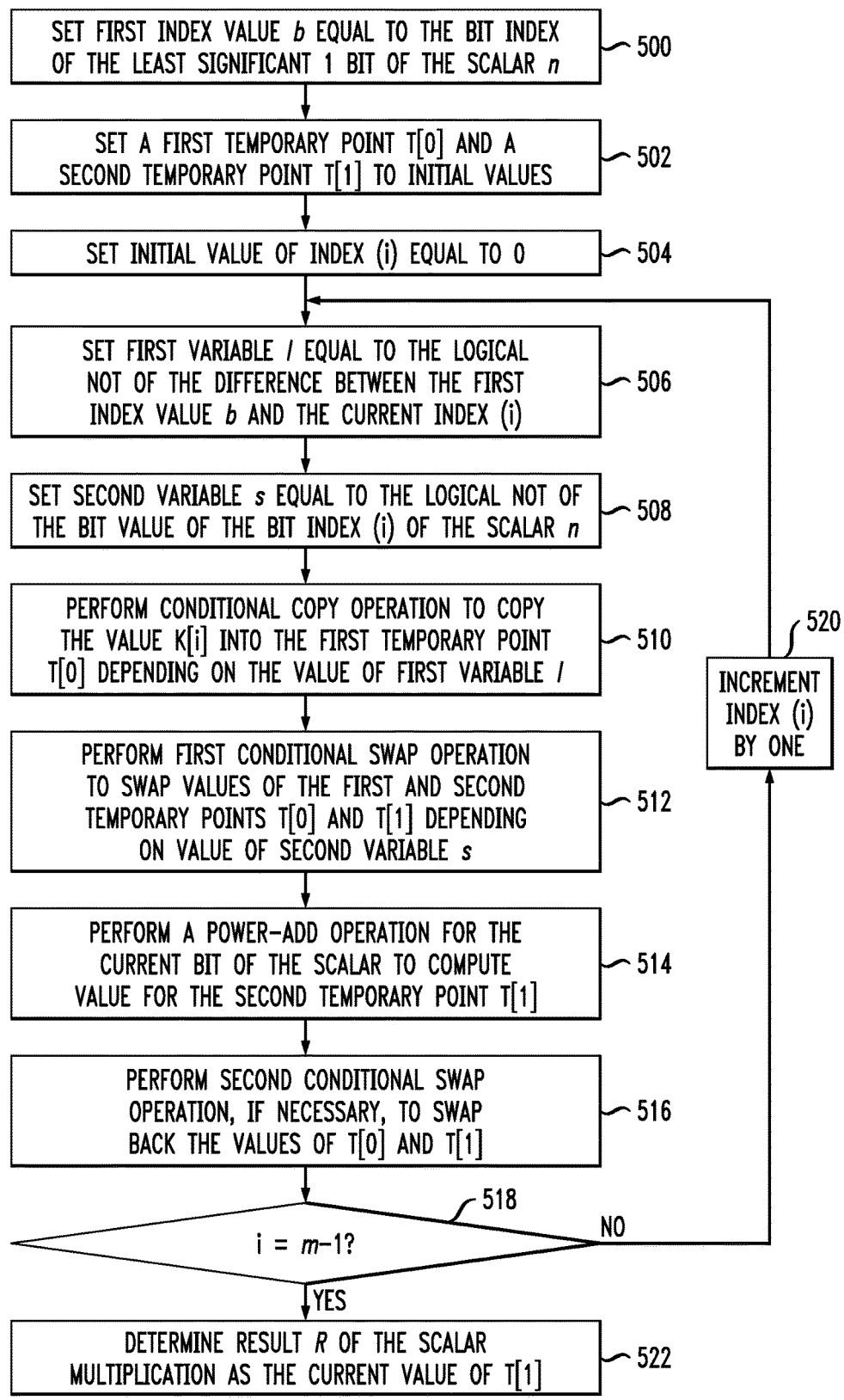
FIG. 5 is a flow diagram that illustrates details of an iterative scalar multiplication process that is used to implement the ladder-based cryptographic method of FIG. 3, according to another embodiment of the invention.

FIG. 5 is a flow diagram which illustrates details of an iterative scalar multiplication process that is used to implement the ladder-based cryptographic method of FIG. 3, according to another embodiment of the invention. In particular, in one embodiment of the invention, FIG. 5 illustrates a constant time and cache-line attack resistant Power Ladder algorithm that can be used to perform the process of block 304 in FIG. 3.

As is known in the art, a side channel attack on a cryptographic algorithm measures some physical medium associated with a computing system that performs the cryptographic algorithm (e.g., cryptosystem) while the cryptographic algorithm is executing. The measurement can either directly or indirectly be used to determine some private/secret information. Efficient implementations of cryptographic algorithms often require different amounts of work to be performed based on the value of a secret. Typically, there is a difference in the amount of work based on whether a bit in the secret is a logic 1 or a logic 0. If enough applications of the algorithm with the same key but different public data are measured, then a statistical analysis can be performed to determine which bits were logic 1s and which were logic 0s. Examples of such side channel attacks are timing attacks, power analysis and cache-line attacks. In these attacks, monitoring of timing, power consumption and/or cache access associated with the cryptosystem can provide a source of information that can be exploited to break the cryptosystem (i.e., learn operations and/or keys of the cryptographic algorithm in order to illicitly obtain plaintext protected by encryption and/or impersonate a source using a digital signature).

The following block of pseudo code illustrates an embodiment of a constant time and cache-line attack resistant Power Ladder process, which will be described in conjunction with the flow diagram of FIG. 5.

B. Power Ladder Process
Input: K is an array of pre-computed points derived from P.
Input: n is scalar to multiply the point P by
Output: R=n·P
1B. b=base 2 index of first 1 in n (least significant 1)
2B. T[0]=P
3B. T[1]=0
4B. For i=0 upto m−1 (where m=number of pre-computed points)
5B. 1=!(b−i)
6B. s=!n[i]
7B. copy_conditional(T[0], K[i], 1)
8B. swap_conditional(T[1], T[0], s)
9B. T[1]=power-add(T[1], T[0], K[i])
10B. swap_conditional(T[1], T[0], s)
11B. R=T[1]

Referring to FIG. 5, an initial step includes setting a first index value equal to the bit index of the least significant 1 bit of the scalar value n (block 500). For example, in one embodiment of the invention as shown in line 1B of the block of pseudo code shown above, a first index value b is set equal to the bit index of the bit of the scalar value n which contains the least significant "1." By way of example, based on the example scalar value n=123 noted above, which has a binary representation of 1111011, the first index value b=0.

Next, a first temporary point T[0] and a second temporary point T[1] are set to initial values (block 502). For example, in one embodiment of the invention as shown in lines 2B and 3B of the block of pseudo code shown above, the first temporary point is set T[0]=P (i.e., 1.P=P) and the second temporary point is set T[1]=0.

An iterative scalar multiplication process is then performed over an index (i) starting from 0 up to the value m−1, wherein m is the number of pre-computed points. In one embodiment of the invention, the iterative process is depicted in lines 5B-10B of the block of pseudo code shown above, and blocks (504-520) of FIG. 5. As an initial step, the index (i) is set equal to the first index value 0 (block 504).

Then, as shown in line 5B of the block of pseudo code shown above, a first variable/is computed as the logical NOT of a difference between the index value b and the current index (i), i.e., 1=!(b−i) (Block 506). Further, as shown in line 6B of the block of pseudo code shown above, a second variable s is computed as the logical NOT of the bit value of the bit index (i) of the scalar n, i.e., s=!n[i] (Block 508). With these steps, 1=1 if (b−i) is 0, and 1=0 when (b−i) is NOT 0. Likewise, s=1 if the bit value of n[i] is 0, and s=0 when the bit value of n[i] is NOT 0. The first and second variables 1 and s are used as inputs to conditional copy and swap operations (lines 7B and 8B of the block of pseudo code shown above), as discussed below.

In particular, a conditional copy operation is performed to copy the value K[i] into the first temporary point T[0] depending on the value of the first variable 1 (block 510). The term K[i] denotes the pre-computed value in the array K having the index of K[i]. In one embodiment of the invention, the copy operation is conditional on the value of 1=1. For each iteration of the loop, access operations are performed for the values T[0] and K[i], but the value of K[i] is not actually copied into T[0] unless 1=1. Therefore, to thwart a potential attack, while the conditional copy operation appears to be accessing data on each iteration, the attacker is prevented from knowing when the actually actual copy operation is performed to copy K[i] into T[0].

Following the conditional copy operation, a first conditional swap operation is performed to swap the values of the first and second temporary points T[0] and T[1] depending the value of the second variable s (block 512). In one embodiment of the invention, the swap operation is conditional on the value of s=1. As noted above, s=1 if the bit value of n[i] is 0. In other words, for a given iteration of the loop, the first conditional swap operation is performed when s=1 (i.e., when bit value of n[i] is 0) to swap the values of the first and second temporary points T[0] and T[1].

In contrast to the first swap operation discussed above with regard to block (408) of FIG. 4 (line 7A of the block of pseudo code shown above for the previously discussed power ladder process), the first conditional swap operation (block 512) is a constant time operation that appears the same to a potential attacker regardless of the value of the second variable s. Therefore, to thwart a potential attack, the use of a constant time conditional swap operation essentially blinds the attacker from seeing any difference in the time of the conditional swap operation for different values of s.

Next, a power-add operation is performed for the current bit of the scalar to compute value for the second temporary point T[1] (block 514). The power-add operation (line 9B of the block of pseudo code shown above) is similar to the power-add operation discussed above with reference to block 410 of FIG. 4 and line 8A of the block of pseudo code shown above, so the details thereof will not be reiterated.

Following the power-add operation, a second conditional swap operation is performed (block 516), if necessary, to swap back the values of T[0] and T[1] using the same operations discussed above. In other words, for a given iteration of the loop, the second conditional swap operation is performed when s=1 (i.e., when bit value of n[i] is 0) to swap back the values of the first and second temporary points T[0] and T[1]. Again, the second conditional swap back operation (line 10B of the block of pseudo code shown above) is a constant time operation that appears the same to a potential attacker regardless of the value of s.

Following each loop of the iterative process, a determination is made as to whether the current value of the index (i) is equal to m−1 (block 518). If the current index value (i) has not reached m−1 (negative determination in block 518), then the index value (i) is incremented by 1 (block 520), and the iterative process (blocks 506-516) is repeated. On the other hand, when the index value (0=m−1 (affirmative determination in block 518), then the result R of the scalar multiplication is determined as the current value of T[1] (block 522), as shown in line 11B of the block of pseudo code shown above.

The embodiment of the Power Ladder process of FIG. 5 as described above is configured to provide a constant time and cache-line attack resistant process for various reasons. For example, the index of the least significant 1 bit can be calculated in constant time, i.e., the computation of line 1B of the block of pseudo code shown above is performed in constant time. Moreover, the Power Ladder process performs the same number of iterations regardless of the value of n, i.e., the iteration is performed (as per line 4B in the block of pseudo code shown above) for i=0 up to m−1 (where m is the number of pre-computed points), which ensures that the same number of operations are performed regardless of the size (number of bits) of the scalar value n. In the regard, no information is leaked about where the first bit starts and where the last bit ends (compare line 5A of the block of pseudo code shown above for the Power Ladder process of FIG. 4). Moreover, as noted above, the copy and swap operations are conditional, so they are constant time operations irrespective of the values of l and s.

The above Power Ladder algorithm starts from the zero index bit. The power-add operation on a Montgomery Curve cannot double and therefore the value of T[0] will not be correct. Therefore, the value $2^i \cdot P$ is copied into T[0] when the first 1 bit is reached.

Figure 6:
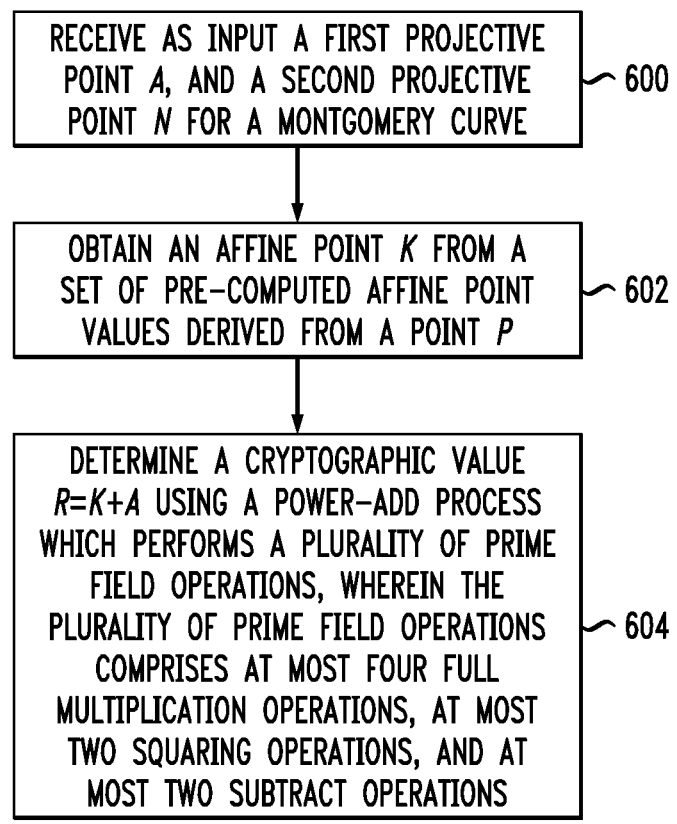
FIG. 6 is a flow diagram of a power-add function that is implemented in a ladder-based cryptographic method to performing scalar multiplication for a Montgomery Curve, according to an embodiment of the invention.

FIG. 6 is a flow diagram of a power-add function that is implemented in a ladder-based cryptographic method to performing scalar multiplication of a Montgomery Curve, according to an embodiment of the invention. Referring to FIG. 6, a first step includes receiving as input a first projective point A, and a second projective point N for a Montgomery curve (block 600). Next, an affine point K is obtained from a set of pre-computed affine point values derived from a point P (block 602). A next step comprises determining a cryptographic value R=K+A using a power-add process which performs a plurality of prime field operations, wherein the plurality of prime field operations comprise at most four full multiplication operations, at most two squaring operations, and at most two subtract operations (block 604). The cryptographic value that is generated is a partial result usable to generate a secure message or a digital signature.

An embodiment of a power-add process for Montgomery curves as generally illustrated in FIG. 6 will be discussed in further detail below with reference to the following example and a block of pseudo code as illustrated below. It is to be understood that FIG. 6 comprises a power-add function (as in block 410 of FIG. 4 and block 514 of FIG. 5) for Montgomery curves. When using a Montgomery curve, the general add operation equations are:

$$X_{m+n} = ((X_m - Z_m) \cdot (X_n + Z_n) + (X_m + Z_m) \cdot (X_n - Z_n))^2 \cdot Z_{m-n}$$

$$Z_{m+n} = ((X_m - Z_m) \cdot (X_n + Z_n) - (X_m + Z_m) \cdot (X_n - Z_n))^2 \cdot X_{m-n},$$

where $(X_m, Z_m)$ is the projective co-ordinate of the first addend, $(X_n, Z_n)$ is the projective co-ordinate of the second addend, $(X_{m-n}, Z_{m-n})$ is the projective co-ordinate of the difference between the two addends and $(X_{m+n}, Z_{m+n})$ is the projective co-ordinate of the sum of the addends. The Power Ladder algorithm always has one of the operands as a pre-computed value that is an affine ordinate i.e. the Z ordinate is 1. Therefore when $Z_n = 1$ the add operation equations are:

$$X_{m+n} = ((X_m - Z_m) \cdot (X_n + 1) + (X_m + Z_m) \cdot (X_n - 1))^2 \cdot Z_{m-n}$$

$$Z_{m+n} = ((X_m - Z_m) \cdot (X_n + 1) - (X_m + Z_m) \cdot (X_n - 1))^2 \cdot X_{m-n}$$

Expanding gives:

$$X_{m+n} = (X_m \cdot X_n - Z_m \cdot X_n + X_m - Z_m + X_m \cdot X_n + Z_m \cdot X_n - X_m - Z_m)^2 \cdot Z_{m-n}$$

$$Z_{m+n} = (X_m \cdot X_n - Z_m \cdot X_n + X_m - Z_m - X_m \cdot X_n - Z_m \cdot X_n + X_m + Z_m)^2 \cdot X_{m-n}$$

Reducing terms gives:

$$X_{m+n} = (2 \cdot X_m \cdot X_n - 2 \cdot Z_m)^2 \cdot Z_{m-n}$$

$$Z_{m+n} = (-2 \cdot Z_m \cdot X_n + 2 \cdot X_m)^2 \cdot X_{m-n}$$

Pulling the common multiplier out gives:

$$X_{m+n} = 4 \cdot (X_m \cdot X_n - Z_m)^2 \cdot Z_{m-n}$$

$$Z_{m+n} = 4 \cdot (X_m - Z_m \cdot X_n)^2 \cdot X_{m-n}$$

In view of the above, an algorithm for performing a power-add function, when A is $(X_m, Z_m)$, N is $(X_{m-n}, Z_{m-n})$ and K is $(X_n, 1)$, is:

C. Power Add Process for Montgomery Curve
Input: A is a projective point (x, z)
N is a projective point (x, z)
K is an affine point (X-ordinate only)
Output: R (x, z)=K+A (when N=K−A).
1C. t0=K·x*A·x
2C. t0=t0−A·z
3C. t1=K·x*A·z
4C. t1=A·x−t1
5C. t0=t0 ^2
6C. t0=t0+t0
7C. t0=t0+t0
8C. t1=t1 ^2
9C. t1=t1+t1
10C. t1=t1+t1
11C. R·x=t0*N·z
12C. R·z=t1*N·x In the above exemplary block of pseudo code, the terms t0 and t1 denote field values (ordinate values). In addition, the term A denotes the point T[1], the term N denotes the point T[0], and the term K denotes the pre-computed point when used in FIGS. 4 and 5. The value of A is added to the pre-computed value K. In addition, N represents the difference between A and K. The field values t0 and t1 are temporary.

The cost of performing a typical add-double step for the Montgomery Ladder is computationally more expensive than performing a power-add step for the Power Ladder according to an embodiment of the invention. For example, a conventional implementation of the Montgomery Ladder algorithm on a Montgomery Curve has an add-double step which comprises the following prime field operations: 5 full multiplication operations, 4 squaring operations, 1 word multiplication operation, 4 add operations, and 4 subtract operations.

In contrast, as illustrated in the block of pseudo code shown above, a power-add step according to an embodiment of the invention for a Montgomery curve comprises the following prime field operations: 4 full multiplication operations (lines 1C, 3C, 11C, and 12C), 2 squaring operations (lines 5C and 8C), 4 add operations (lines 6C, 7C, 9C and 10C), and 2 subtract operations (lines 2C and 4C). The exemplary power-add process illustrated above eliminates 1 full multiplication operation, 2 squaring operations, 1 word multiplication operation, and 2 subtract operations which would otherwise be included in a conventional add-double step for the Montgomery Ladder. It is known that full multiplication and squaring are the most expensive prime field operations.

It is to be understood that the particular functionality and processing operations described in conjunction with FIGS. 1, 2, 3, 4, 5, and 6 for example, are presented by way of illustrative example only, and should not be construed as limiting the scope of the invention in any way. For example, in addition to elliptic curves (e.g., Montgomery curves) as discussed above, a Power Ladder algorithm according to alternative embodiments of the invention can be utilized with any curve that has the Montgomery Ladder algorithm defined including, for example, Edwards Curves (with a square d) over prime fields and a Weierstrass curve over a polynomial (or binary) field. The use of a Power Ladder process on a fixed point P is advantageous for increasing the speed of a sign operation for an ECDSA algorithm and the generation operation of the ECDH algorithm. These algorithms are used in internet protocols like TLS, IPSec and SSH. Faster algorithms result in faster connection times.

In this regard, it is to be understood that many variations may be made in the particular arrangements shown and described. For example, although described in the context of particular system and device configurations, the techniques are applicable to a wide variety of other types of information processing systems, processing devices, and other components. In addition, the particular modules, processing operations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. A method comprising:
receiving, by a first computing device, a first input value and a second input value, wherein the first input value comprises a fixed point on a curve and wherein the second input value comprises a scalar value;
obtaining, by the first computing device, a set of pre-computed values, wherein each pre-computed value is computed as the first input value multiplied by a given multiple in a set of multiples comprising powers of 2;
performing, by the first computing device, a cryptographic process to generate a cryptographic value which comprises a scalar multiplication of the first input value and the second input value;
wherein performing the cryptographic process comprises performing an iterative scalar multiplication process in which each iteration of the iterative scalar multiplication process is implemented using a single point add operation to multiply a bit of the second input value with one of the pre-computed values in the set of pre-computed values to generate a temporary value which is updated after each iteration of the iterative scalar multiplication process, wherein a final temporary value which results from a last iteration of the iterative scalar multiplication process comprises said cryptographic value;
utilizing, by the first computing device, the cryptographic value to generate a secure message or a digital signature; and
transmitting, by the first computing device, the secure message or digital signature to a second computing device over a computer network to enable secured communications between the first and second computing devices over the computer network using the secure message or digital signature.

2. The method of claim 1, wherein the curve is an elliptical curve.

3. The method of claim 1, wherein the set of pre-computed values include the fixed point multiplied by each power of 2 value that is less than the scalar value.

4. The method of claim 1, wherein performing the cryptographic process comprises:
setting a first index value equal to a bit index of a least significant bit of the scalar value which has a bit value of 1;
setting a second index value equal to a bit index of a most significant bit of the scalar value which has a bit value of 1;
setting a first temporary point T[0] equal to 0;
setting a second temporary point T[1] equal to a pre-computed value in the set of pre-computed values having an index corresponding to the first index value; and performing the iterative scalar multiplication process over an index (i) starting from the first index value to the second index value.

5. The method of claim 4, wherein performing the iterative scalar multiplication process comprises:
setting a first variable equal to a value of the bit of the scalar value having a bit index corresponding to a current value of the index(i);
performing a first swap operation to swap values of the first and second temporary points T[0] and T[1] depending a value of the first variable;
performing a power-add function for the current bit of the scalar to compute a value for the second temporary point T[1]; and
performing a second swap operation to swap back the values of the first and second temporary points T[0] and T[1], if the values of the first and second temporary points T[0] and T[1] were swapped by the first swap operation.

6. The method of claim 5, wherein performing the power-add function comprises:
accessing current values of the first and second temporary points T[0] and T[1], and the pre-computed value having an index corresponding to the current index (i);
adding the value of the second temporary point T[1] and the pre-computed value having the index corresponding to the current index (i), with knowledge of a difference between T[1] and said pre-computed value, wherein the difference is the value of the first temporary point T[0]; and
storing a result of the power-add operation as a value of the second temporary point T[1].

7. The method of claim 5, wherein a final value of the second temporary point comprises the cryptographic value.

8. The method of claim 1, wherein performing the cryptographic process comprises:
setting a base index value equal to a bit index of a least significant bit of the scalar value which has a bit value of 1;
setting a first temporary point T[0] equal to a value of the fixed point;
setting a second temporary point T[1] equal to 0; and
performing the iterative scalar multiplication process over an index (i) starting from 0 up to m−1, wherein m denotes a number of pre-computed values.

9. The method of claim 8, wherein performing the iterative scalar multiplication process comprises:
setting a value of a first variable equal to a logical NOT of a difference between the base index and a current value of the index (i);
setting a value of a second variable equal to a logical NOT of a value of the bit of the scalar value which has an index corresponding to the current index (i);
performing a conditional copy operation to copy a pre-computed value in the set of pre-computed values, which has an index corresponding to the current value of the index (i), into the temporary point T[0] depending on the value of the first variable;
performing a first conditional swap operation to swap values of the first and second temporary points T[0] and T[1] depending the value of the second variable;
performing a power-add function for the current bit of the scalar to compute a value for the second temporary point T[1]; and
performing a second conditional swap operation to swap back the values of the first and second temporary points T[0] and T[1], if the values of the first and second temporary points T[0] and T[1] were swapped by the first conditional swap operation.

10. The method of claim 9, wherein performing the power-add function comprises:
accessing current values of the first and second temporary points T[0] and T[1], and the pre-computed value having an index corresponding to the current index (i);
adding the values of the second temporary point T[1] and the pre-computed value having the index corresponding to the current index (i), with knowledge of the difference between T[1] and said pre-computed value, wherein the difference value is the value of the first temporary point T[0]; and
storing a result of the power-add operation as a value of the second temporary point T[11].

11. The method of claim 1, wherein obtaining the set of pre-computed values comprises:
computing the set of pre-computed values prior to performing the cryptographic process;
storing the set of pre-computed values in memory; and
accessing the stored set of pre-computed values during the cryptographic process.

12. The method of claim 1, wherein obtaining the set of pre-computed values comprises:
computing at least one of the pre-computed values in the set of pre-computed values prior to performing the cryptographic process; and
computing at least one of the pre-computed values in the set of pre-computed values in parallel with performing the cryptographic process.

13. An article of manufacture comprising a processor-readable storage medium having stored therein program code of one or more software programs, wherein the program code when executed by at least one processing device causes said at least one processing device to perform method steps of claim 1.

14. A computing device comprising:
at least one processing device comprising a processor coupled to a memory, wherein the at least one processor device is configured to process program code stored in the memory to instantiate a cryptographic module, wherein the cryptographic module is configured:
to receive a first input value and a second input value, wherein the first input value comprises a fixed point on a curve and wherein the second input value comprises a scalar value;
to obtain a set of pre-computed values, wherein each pre-computed value is computed as the first input value multiplied by a given multiple in a set of multiples comprising powers of 2; and
to perform a cryptographic process to generate a cryptographic value which comprises a scalar multiplication of the first input value and the second input value;
wherein performing the cryptographic process comprises performing an iterative scalar multiplication process in which each iteration of the iterative scalar multiplication process is implemented using a single point add operation to multiply a bit of the second input value with one of the pre-computed values in the set of pre-computed values to generate a temporary value which is updated after each iteration of the iterative scalar multiplication process, wherein a final temporary value which results from a last iteration of the iterative scalar multiplication process comprises said cryptographic value;
utilize the cryptographic value to generate a secure message or a digital signature; and transmit, by the computing device, the secure message or digital signature to another computing device over a computer network to enable secured communications between the computing devices over the computer network using the secure message or digital signature.

15. A method comprising:
receiving, by a first computing device, a first projective point A, and a second projective point N for a Montgomery curve;
obtaining, by the first computing device, an affine point K from a set of pre-computed affine point values derived from a point P;
determining, by the first computing device, a cryptographic value R=K+A using a power-add process which performs a plurality of prime field operations, wherein the plurality of prime field operations comprises at most four full multiplication operations, at most two squaring operations, and at most two subtract operations, wherein the cryptographic value that is generated is a partial result usable to generate a secure message or a digital signature; and
utilizing, by the first computing device, the cryptographic value, in part, to generate a secure message or a digital signature; and
transmitting, by the first computing device, the secure message or digital signature to a second computing device over a computer network to enable secured communications between the first and second computing devices over the computer network using the secure message or digital signature.

16. The method of claim 15, wherein the power-add process does not utilize a word multiplication operation.

17. An article of manufacture comprising a processor-readable storage medium having stored therein program code of one or more software programs, wherein the program code when executed by at least one processing device causes said at least one processing device to perform the method steps of claim 15.

18. An apparatus comprising:
at least one processing device comprising a processor coupled to a memory, wherein the at least one processor device is configured to process program code stored in the memory to instantiate a cryptographic module, wherein the cryptographic module is configured to perform the method steps of claim 15.

\* \* \* \* \*